United States Patent
Huang et al.

(10) Patent No.: US 11,902,611 B2
(45) Date of Patent: Feb. 13, 2024

(54) METHOD AND SYSTEM FOR EDGE SERVER SELECTION FOR IN-VEHICLE MEDIA CONTENT DISTRIBUTION WITH DEEP REINFORCEMENT LEARNING

(71) Applicant: Toyota Motor Engineering & Manufacturing North America, Inc., Plano, TX (US)

(72) Inventors: Siqi Huang, Charlotte, NC (US); Haoxin Wang, Charlotte, NC (US); Akila C. Ganlath, Agua Dulce, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 66 days.

(21) Appl. No.: 17/683,798

(22) Filed: Mar. 1, 2022

(65) Prior Publication Data

US 2023/0283827 A1 Sep. 7, 2023

(51) Int. Cl.
*H04N 21/414* (2011.01)
*H04N 21/24* (2011.01)
*H04N 21/466* (2011.01)

(52) U.S. Cl.
CPC ... *H04N 21/41422* (2013.01); *H04N 21/2407* (2013.01); *H04N 21/4666* (2013.01)

(58) Field of Classification Search
CPC ......... H04N 21/41422; H04N 21/2407; H04N 21/4666
See application file for complete search history.

(56) References Cited

U.S. PATENT DOCUMENTS

| 8,422,460 B2 * | 4/2013 | Jain | H04W 36/0055 |
| | | | 455/445 |
| 8,977,766 B2 | 3/2015 | Peters et al. | |

(Continued)

FOREIGN PATENT DOCUMENTS

| CN | 103685547 A | 3/2014 |
| EP | 3629059 A1 | 4/2020 |
| JP | 2019045970 A | 3/2019 |

OTHER PUBLICATIONS

Junyoung Park, Jaehyeong Chung, San Hun Kim, Youngkook Kim and Jinkyoo Park, "Learning to schedule job-shop problems: representation and policy learning using graph neural network and reinforcement learning, International Journal of Production Research", (2021), 59:11, 3360-3377, DOI: 10.1080/00207543.2020.1870013.

(Continued)

*Primary Examiner* — Randy A Flynn
(74) *Attorney, Agent, or Firm* — DINSMORE & SHOHL LLP (57) ABSTRACT

A method is provided including receiving a planned route of a vehicle and a request to download content from a cloud server, the planned route traveling through an area covered by a plurality of edge servers, determining a state comprising possible connections between the vehicle and each of the plurality of edge servers at a plurality of time steps during the planned route, inputting the state to a trained model, the model being trained to output an action comprising a partition of the content across the plurality of edge servers that minimizes latency of transmission of the content from the cloud server to the vehicle via the plurality of edge servers, based on the state, and partitioning the content across the plurality of edge servers based on the action out by the trained mode.

16 Claims, 10 Drawing Sheets

(56) References Cited

U.S. PATENT DOCUMENTS

| | | |
|---|---|---|
| 10,902,461 B2 | 1/2021 | Frost et al. |
| 11,064,216 B2 | 7/2021 | Abe et al. |
| 11,079,245 B1 | 8/2021 | Niewiadomski |
| 11,240,563 B1* | 2/2022 | Samarthyam ...... H04N 21/2146 |
| 2019/0289610 A1* | 9/2019 | Ju ........................... H04L 67/52 |
| 2019/0319868 A1* | 10/2019 | Svennebring ......... H04W 24/08 |
| 2021/0051073 A1* | 2/2021 | Halepovic .......... H04N 21/2385 |
| 2022/0124543 A1* | 4/2022 | Orhan ................. H04W 28/021 |
| 2022/0138156 A1* | 5/2022 | Wang ..................... H04L 69/28 |
| | | 707/740 |

OTHER PUBLICATIONS

Jao Rico, Jose Baraterio, and Arlindo Oliveria, "Graph Neural Networks for Traffic Forecasting", Apr. 27, 2021, arXiv:2104.13096 [cs.LG].

Paul Almasan, Arnau Badia-Sampera, Pere Barlet-Ros, Jose Suarez-Varela, Krzysztof Rusek, Albert Cabellos-Aparicio, "Deep Reinforcement Learning meets Graph Neural Networks: exploring a routing optimization use case", Feb. 14, 2020, arXiv: 1910.07421v2 [cs.NI].

* cited by examiner

METHOD AND SYSTEM FOR EDGE SERVER SELECTION FOR IN-VEHICLE MEDIA CONTENT DISTRIBUTION WITH DEEP REINFORCEMENT LEARNING

TECHNICAL FIELD

The present specification relates to transmitting data to vehicles via edge servers, and more particularly to a method and system for edge server selection for in-vehicle media content distribution with deep reinforcement learning.

BACKGROUND

As autonomous vehicles become more readily available, their use will become more prevalent by drivers. Because autonomous vehicles are able to perform driving tasks without input by a human driver, the human driver or other passengers of the vehicle are able to engage in work and/or entertainment activities while driving. These activities may include engaging in video conferencing or viewing augmented reality (AR), virtual reality (VR), or other media content. In particular, a driver may request a vehicle to download media content that the driver may view during a driving trip.

However, media content may comprise a large amount of data that may be difficult for the vehicle to efficiently download during a driving trip. One method of transmitting media content to a vehicle may be through the use of one or more edge servers. However, while a vehicle is driving, the vehicle may only be within range of a particular edge server for a limited period of time, which may not be sufficient for the vehicle to completely download a media file from the edge server. Thus, in order to download a media file, it may be desirable to partition the media file across multiple edge servers, such that the vehicle can download different portions of the media file from each of the multiple edge servers when the vehicle is within range of each respective edge server. Accordingly, a need exists for improved methods and systems to efficiently partition media files across multiple edge servers such that the media file can be transmitted to a vehicle via the edge servers.

SUMMARY

In an embodiment, a method may include receiving a planned route of a vehicle and a request to download content from a cloud server, the planned route traveling through an area covered by a plurality of edge servers, determining a state comprising possible connections between the vehicle and each of the plurality of edge servers at a plurality of time steps during the planned route, inputting the state to a trained model, the model being trained to output an action comprising a partition of the content across the plurality of edge servers that minimizes latency of transmission of the content from the cloud server to the vehicle via the plurality of edge servers, based on the state, and portioning the content across the plurality of edge servers based on the action output by the trained model.

In another embodiment, a method may include receiving training data comprising a plurality of vehicle trajectories and a request to download content from a cloud server associated with each vehicle trajectory, each vehicle trajectory traveling through an area covered by a plurality of edge servers, for each vehicle trajectory, determining a graph associated with the vehicle trajectory, the graph indicating a state comprising possible connections between a vehicle and the plurality of edge servers at a plurality of time steps during the vehicle trajectory, each edge server comprising a node of the graph, and each possible connection between the vehicle and an edge server comprising an edge of the graph, inputting the state associated with each vehicle trajectory into a model configured to output an action, the action comprising a partition of the content associated with the vehicle trajectory associated with the state across the plurality of edge servers, and inputting each state and each associated action determined by the model into a graph neural network configured to train the model to minimize latency of transmission of the content from the cloud server to the vehicle via the plurality of edge servers using reinforcement learning.

In another embodiment, a remote computing device may include a controller programmed to receive a planned route of a vehicle and a request to download content from a cloud server, the planned route traveling through an area covered by a plurality of edge servers, determine a state comprising possible connections between the vehicle and each of the plurality of edge servers at a plurality of time steps during the planned route, input the state to a trained model, the model being trained to output an action comprising a partition of the content across the plurality of edge servers that minimizes latency of transmission of the content from the cloud server to the vehicle via the plurality of edge servers, based on the state, and partition the content across the plurality of edge servers based on the action output by the trained model.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for edge server selection for in-vehicle media content distribution with deep reinforcement learning. As a vehicle is being driven, either autonomously, semi-autonomously, or manually, a driver or other passenger of the vehicle of the vehicle may request to download media content from a cloud server. In response to the request, the cloud server may transmit the media content to the vehicle via one or more edge servers that the vehicle will be within range of during a driving trip. In particular, if the vehicle will not be within range of any one edge server long enough to download the entirety of the media content, the cloud server may divide the media content into a plurality of partitions, and may transmit each partition to a different edge server. As such, when the vehicle is within range of each edge server, the vehicle may download the appropriate partition. Accordingly, over the course of the driving trip, the vehicle may download the entirety of the media content.

It may be desirable to partition the media content across the plurality of edge servers in such a way that minimizes latency for the media content to be received by the vehicle. However, determining the optimal way to partition the media content over the plurality of edge servers that minimizes latency in consideration of vehicle trajectory, edge server capacity, and network bandwidth is an NP-hard problem using traditional optimization algorithms. Accordingly, in embodiments disclosed herein, a Graph Neural Network (GNN) using reinforcement learning is provided to train a model to optimally determine the partition of the media content across a plurality of edge servers to minimize latency.

Figure 1:
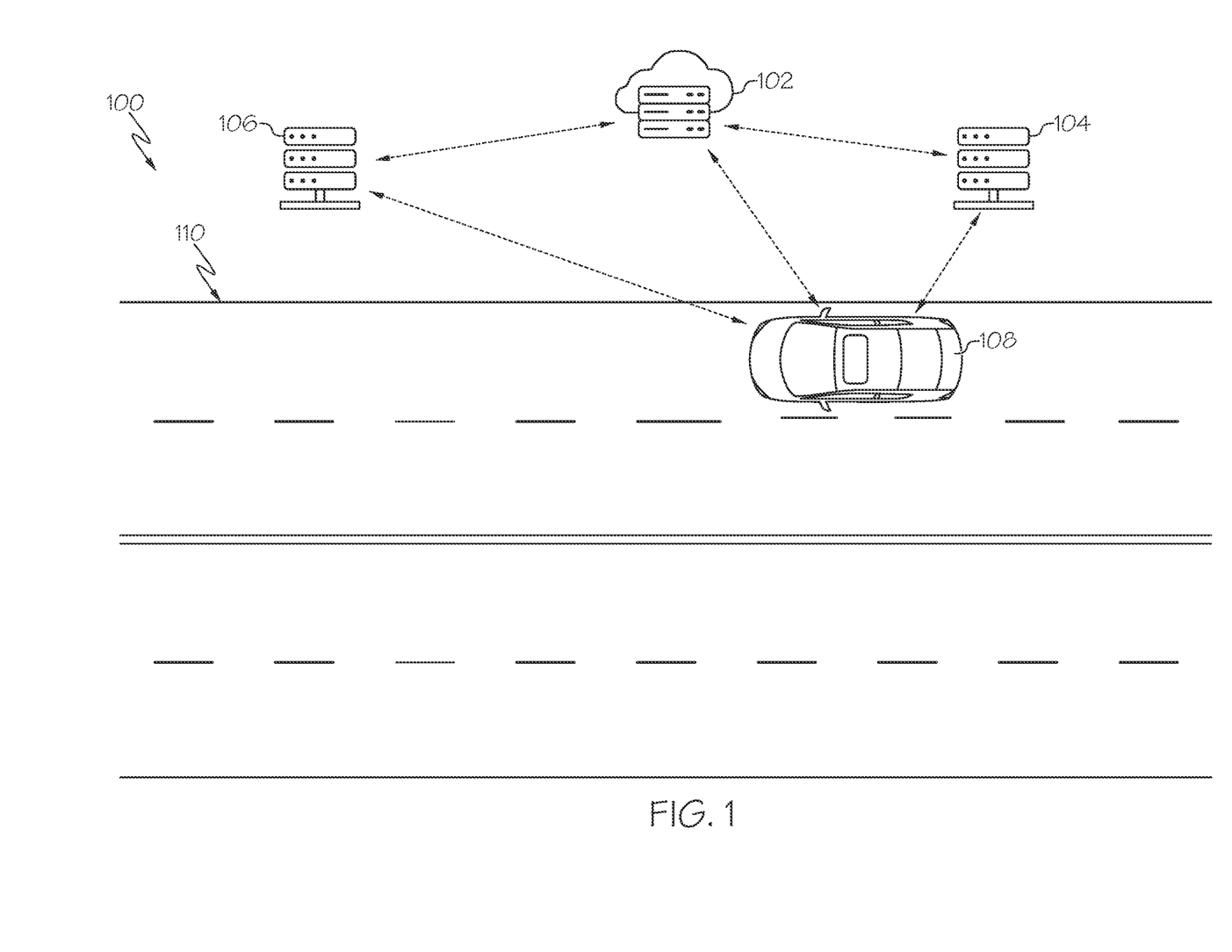
FIG. 1 schematically depicts a system for edge server selection, according to one or more embodiments shown and described herein.

Turning now to the figures, FIG. 1 schematically depicts a system for edge server selection for in-vehicle media content distribution with deep reinforcement learning. In the example of FIG. 1, a system 100 includes a cloud server 102, edge servers 104 and 106, and a vehicle 108 driving along a road 110.

In the example of FIG. 1, the vehicle 108 is a connected vehicle. A connected vehicle is able to communicate remotely with systems outside of the vehicle (e.g., with the cloud server 102 and/or the edge server 104, 106). In the example of FIG. 1, the cloud server 102 may be communicatively coupled to the edge servers 104, 106. Also in the example of FIG. 1, the vehicle 108 may be communicatively coupled to the cloud server 102 and the edge server 104 and 106.

In the illustrated example, the cloud server 102 comprises a cloud computing device. However, in other examples, the cloud server 102 may be any other type of remote computing device communicatively coupled to the edge server 104, 106 and the vehicle 108.

In some examples, the edge servers 104, 106 may comprise road-side units (RSUs) positioned near the road 110. While the example of FIG. 1 illustrates two edge servers 104, 106, it should be understood that in other examples, the system 100 may comprise any number of edge servers. The edge servers of the system 100 may be spaced along the road 110 such that each edge server covers a different service area. That is, as the vehicle 108 drives along the road 110, the vehicle 108 may be within range of one or more edge servers at any given time. Thus, as the vehicle 108 drives along the road 110, the vehicle 108 may move between coverage areas of different edge servers. At some locations along the road 110, the vehicle 108 may be in range of a single edge server. At other locations along the road 110, the vehicle 108 may be in range of multiple edge servers. At still other locations along the road 110, the vehicle 108 may not be in range of any edge servers.

As disclosed herein, the vehicle 108 may transmit a request to the cloud server 102 to receive large-sized data such as media content, 3D map data, and the like via one or more edge servers (e.g., the edge servers 104, 106). The request transmitted by the vehicle 108 may include a planned trajectory of the vehicle 108 during a particular driving trip. Thus, the cloud server 102 may determine how long the vehicle 108 will be within range of each edge server during the driving trip. The request may also include the specific media content to be downloaded from the cloud server 102.

If, during the driving trip, the vehicle 108 is within range of a single edge server long enough to download the entire media content, then the cloud server 102 may transmit the entirety of the media content to that edge server, and the vehicle 108 may download the media content from the edge server. However, if the vehicle 108 is not within range of a single edge server long enough to download the entire media content, the cloud server may divide the media content into multiple partitions and may transmit each partition to a different edge server.

Figure 4:
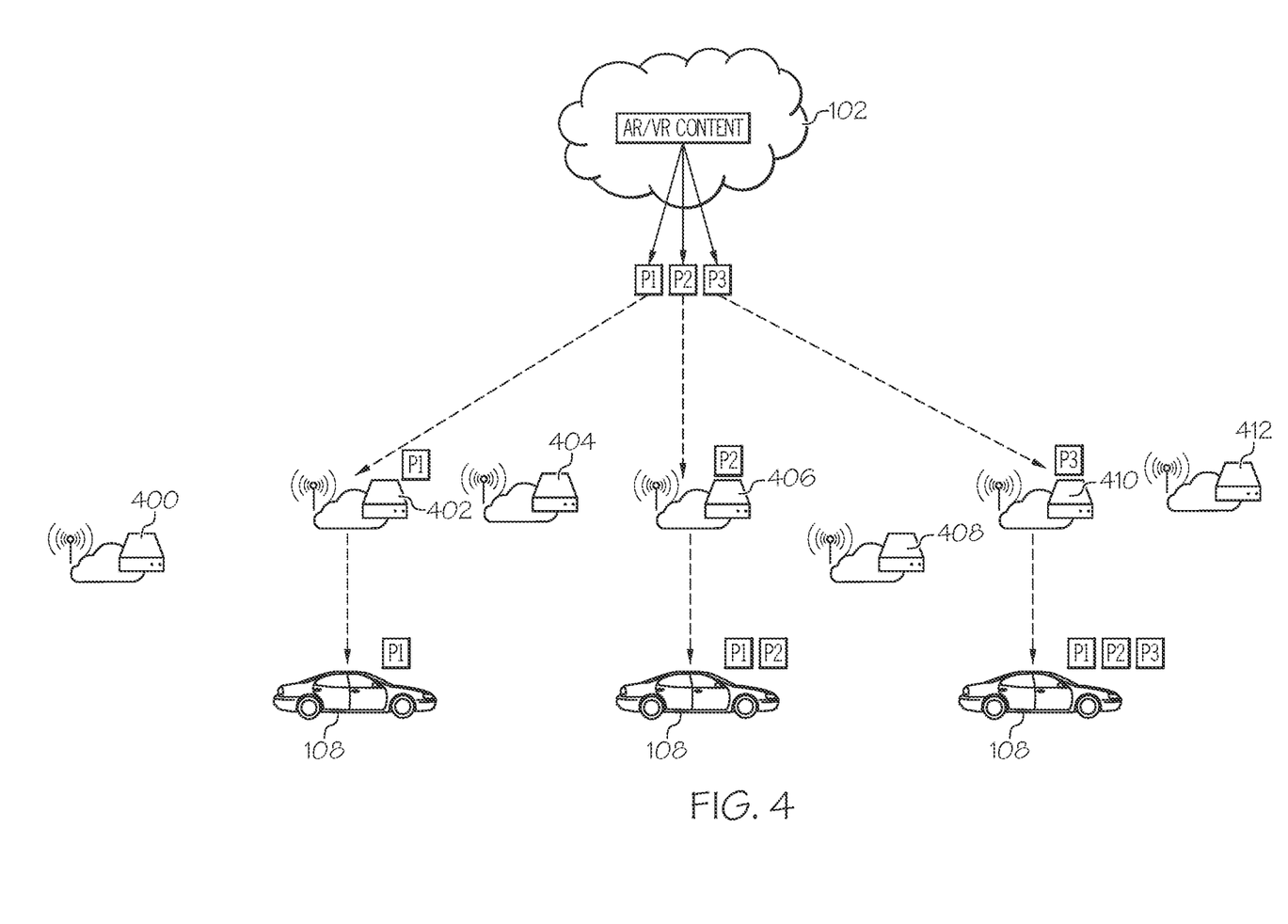
FIG. 4 depicts an example partition of media content across multiple edge servers, according to one or more embodiments shown and described herein.

For instance, FIG. 4 shows an example where the vehicle 108 requests media content from the cloud server 102 and drives past edge servers 400, 402, 404, 406, 408, 410, and 412 during a driving trip. In the example of FIG. 4, the cloud server 102 partitions the media content into packages P1, P2, and P3. The cloud server 102 transmits package P1 to edge server 402, transmits package P2 to edge server 406, and transmits package P3 to edge server 410. Then, the vehicle 108 receives package P1 from edge server 402, receives package P2 from edge server 406, and receives package P3 from edge server 410, such that the vehicle 108 eventually receives the entire media content. In embodiments disclosed herein, the cloud server 102 may be trained to determine an optimal way to partition the media content across multiple edge servers.

Figure 2:
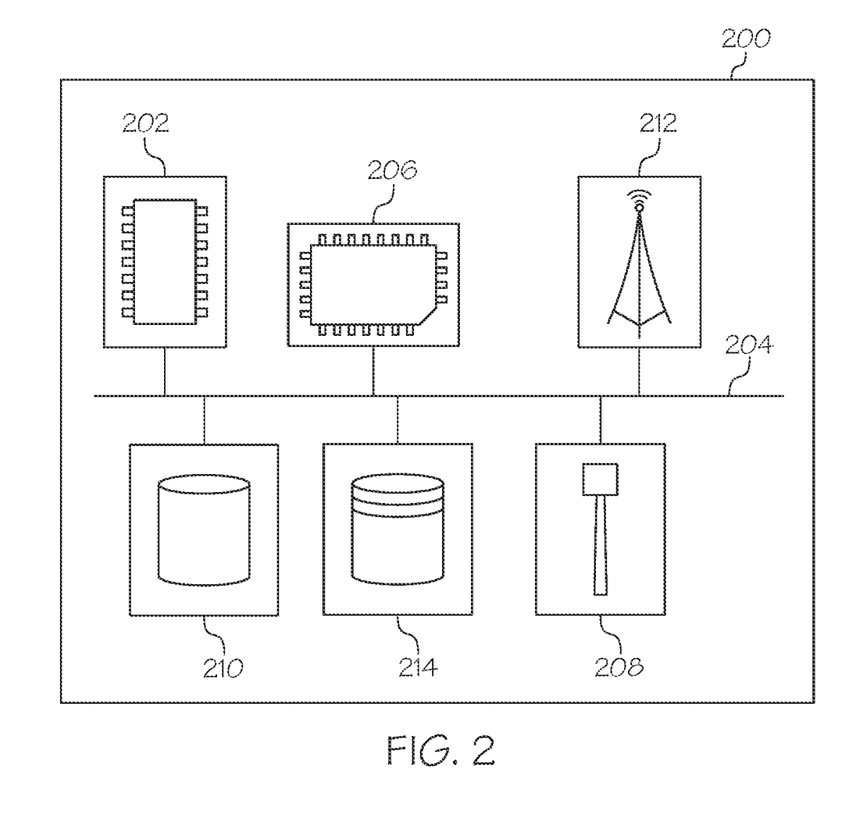
FIG. 2 depicts a schematic diagram of a vehicle system, according to one or more embodiments shown and described herein.

FIG. 2 depicts an example vehicle system 200 that may be included in the vehicle 108 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. For an autonomous vehicle, the vehicle sensors 210 may be used to autonomously drive the vehicle. For a manually driven vehicle, the vehicle sensors 210 may collect other data or the vehicle sensors 210 may not be included in the vehicle system 200 of a non-autonomous vehicle.

Still referring to FIG. 2, the vehicle system 200 comprises network interface hardware 212 for communicatively coupling the vehicle system 200 to the cloud server 102 and the edge servers 104, 106. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit a request for media content to the cloud server 102 and may download media content from the edge servers 104, 106, as disclosed herein.

Still referring to FIG. 2, the vehicle system 200 comprises a data storage component 214. The data storage component 214 may store data used by various components of the vehicle system 200. In addition, the data storage component 214 may store media content received from the cloud server 102 via one or more edge servers (e.g., the edge servers 104, 106 of FIG. 1).

In some embodiments, the vehicle system 200 may be communicatively coupled to the cloud server 102 and/or the edge servers 104, 106 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
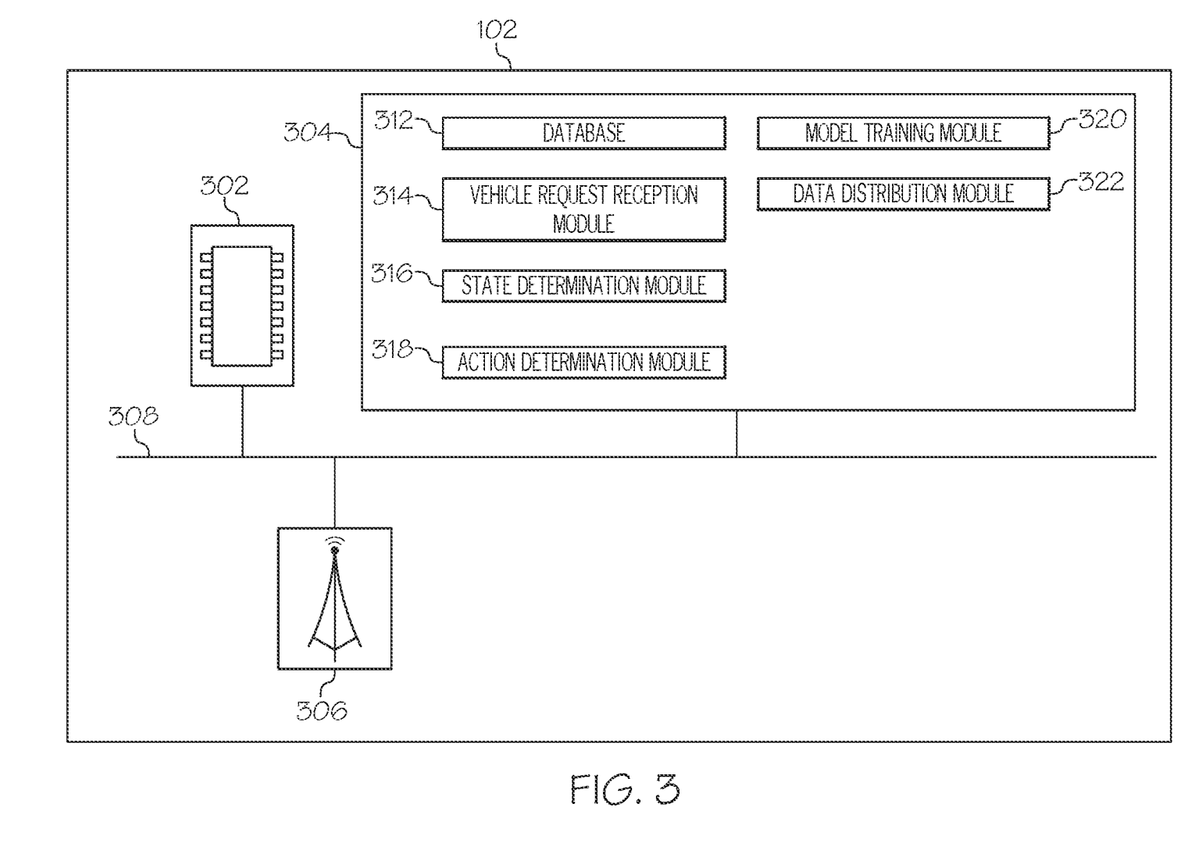
FIG. 3 depicts a schematic diagram of the cloud server of FIG. 1, according to one or more embodiments shown and described herein.

Now referring to FIG. 3, the cloud server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. In some examples, the network interface hardware 306 may include two different channels including a Dedicated Short-Range Communication (DSRC) channel and a millimeter wave radio channel, as discussed in further detail below. The network interface hardware 306 of the cloud server 102 may transmit and receive data to and from vehicles (e.g., the vehicle 108 of FIG. 1) and one or more edge servers (e.g., the edge servers 104, 106 of FIG. 1).

The one or more memory modules 304 include a database 312, a vehicle request reception module 314, a state determination module 316, an action determination module 318, a model training module 320, and a data distribution module 322. Each of the database 312, the vehicle request reception module 314, the state determination module 316, the action determination module 318, the model training module 320, and the data distribution module 322 may be a program module in the form of operating systems, application program modules, and other program modules stored in the one or more memory modules 304. In some embodiments, the program module may be stored in a remote storage device that may communicate with the cloud server 102. In some embodiments, one or more of the database 312, the vehicle request reception module 314, the state determination module 316, the action determination module 318, the model training module 320, and the data distribution module 322 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store data received from the vehicle 108. The database 312 may also store parameters of a trained model, as disclosed in further detail below. The database 312 may also store training data used to train the model, as disclosed in further detail below. The database 312 may also store information about edge servers (e.g., their locations, transmission ranges, and bandwidth capacities), as disclosed in further detail below. The database 312 may also store other data used by the memory modules 304.

The vehicle request reception module 314 may receive a request for media content from the vehicle 108. As discussed above, the cloud server 102 may transit media content to the vehicle 108 via one or more edge servers. Accordingly, the request received by the vehicle request reception module 314 may include particular media content (e.g., video content) desired to be received by the vehicle 108. The request may also include a planned trajectory of the vehicle 108 during a driving trip. Accordingly, the cloud server 102 may determine which edge servers will be within range of the vehicle 108 at different points during the driving trip based on the received vehicle trajectory, as disclosed herein.

The state determination module 316 may determine a state to be input to the model based on the vehicle trajectory, and the locations and bandwidth capacities of the edge server, as disclosed herein. In embodiments, the database 312 of the cloud server 102 may store a map of edge servers to which the cloud server 102 is communicatively coupled. This map may indicate locations of edge servers to which the cloud server 102 is able to transmit media content to be relayed to vehicles. The map may also indicate a transmission range of each edge server. That is, the map may indicate a distance within which each edge server is able to communicate with vehicles. This may allow the state determination module 316 to determine when the vehicle 108 is expected to be within range of different edge servers, as disclosed herein.

As discussed above, the vehicle request reception module 314 may receive a request that includes a planned trajectory of the vehicle 108 during a driving trip. As such, the state determination module 316 may determine an expected location of the vehicle 108 at a plurality of future time steps during the driving trip, based on the received trajectory. Thus, based on the map of edge servers and the planned trajectory, the state determination module 316 may determine which edge servers are expected to be within range of the vehicle 108 at each time step during the driving trip.

In particular, the state determination module 316 may determine the expected location of the vehicle 108 at a plurality of future time steps based on the received trajectory. For example, the state determination module 316 may estimate the speed of the vehicle 108 at different points along the planned trajectory based on speed limits of the various roads included in the received trajectory and/or historical driving data. In other examples, the state determination module 316 may utilize other techniques to estimate the speed of the vehicle 108 along the trajectory. By estimating the speed of the vehicle 108 at different points along the trajectory, the state determination module 316 may estimate the location of the vehicle 108 at future time steps during the driving trip.

Figure 5:
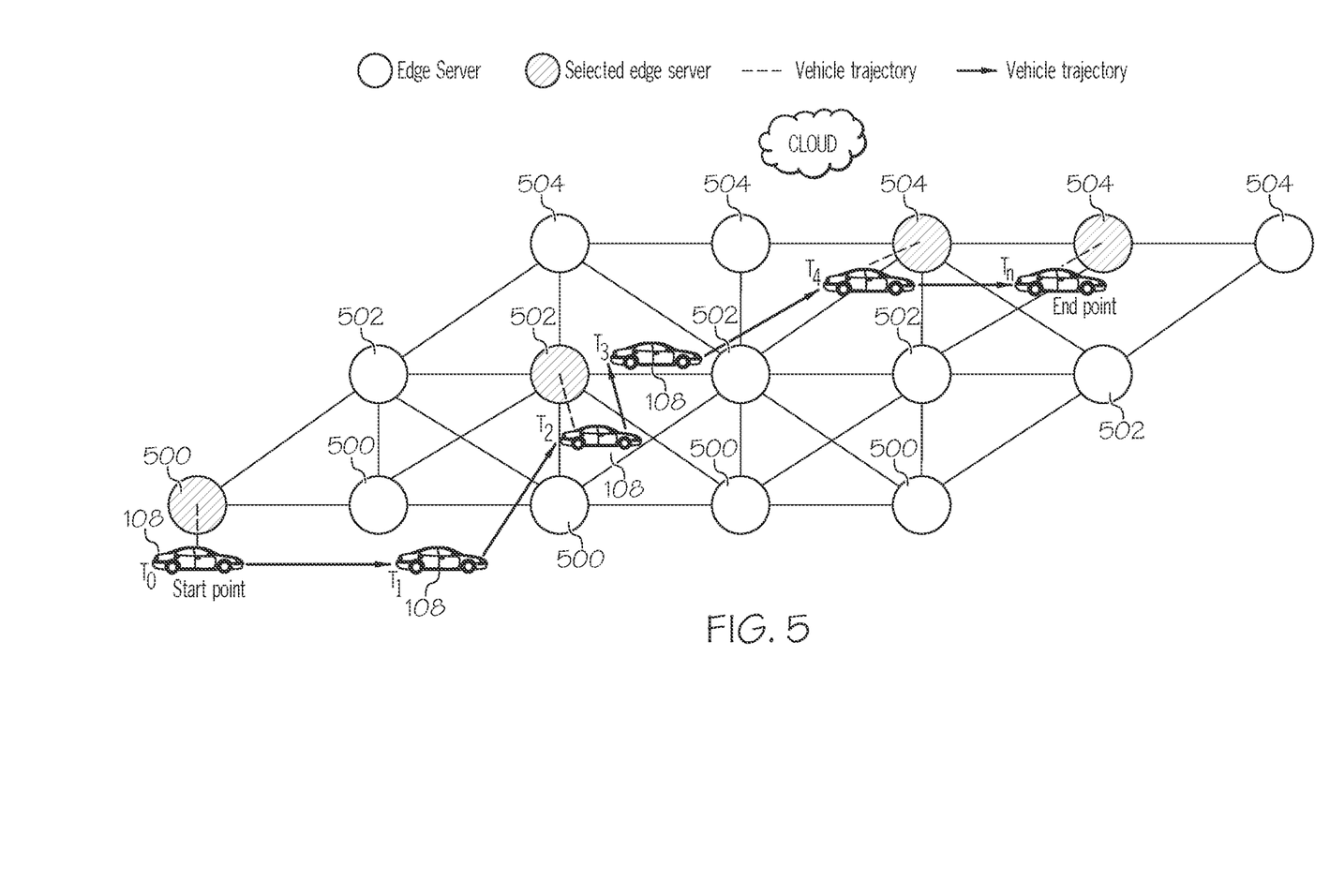
FIG. 5 depicts an example illustration of a state, according to one or more embodiments shown and described herein.

By estimating the location of the vehicle 108 at future time steps during the driving trip, and accessing the map stored in the database 312 indicating the locations and transmission ranges of a plurality of edge servers, the state determination module 316 may determine which edge servers are within transmission range of the vehicle 108 at each time step during the driving trip. For instance, FIG. 5 shows an example trajectory of the vehicle 108 with respect to three different edge servers 500, 502, and 504. In the example of FIG. 5, the vehicle trajectory is shown for time steps T0, T1, T2, T3, T4, and Tn. The time steps may be of any length (e.g., one second, one minute). In the example of FIG. 5, the vehicle 108 is within range of edge server 500 at time step T0, within range of edge servers 500 and 502 at time step T1, within range of edge servers 500, 502, and 504 at time steps T2, T3 and T4, and within range of edge servers 502 and 504 at time step Tn.

In embodiments, the state determination module 316 determines a state comprising all possible connections between the vehicle 108 and a plurality of edge servers during the planned driving trip of the vehicle. Thus, the state indicates all of the edge servers that are expected to be within range of the vehicle 108 at each time step of the driving trip. This state can be represented graphically by treating each edge server within range of the vehicle 108 at each time as a node, and treating each possible connection between the vehicle 108 and an edge server at different time steps as an edge, as shown in FIG. 5. Thus, the state determination module 316 may determine a graph indicating a state of the vehicle 108 and a plurality of edge servers based on the vehicle trajectory received by the vehicle request reception module 314 and the map of edge servers stored in the database 312.

Referring back to FIG. 3, the action determination module 318 may determine an action based on the state determined by the state determination module 316, as disclosed herein. As discussed above, the state determination module 316 determines a state comprising the possible connections between the vehicle 108 and various edge servers at different time steps during a driving trip. However, the state merely determines possible connections between the vehicle 108 and different edge servers. An action, as determined by the action determination module 318, may indicate which edge servers the vehicle 108 actually connects to during each time step of the driving trip. In addition, the action may also determine a package size (e.g., a size of a partition of the requested media content) that each edge server will receive from the cloud server 102, and relay to the vehicle 108.

During each time step, the vehicle 108 can connect to, at most, a single edge server. Thus, for each time step, each edge server within range of the vehicle 108 can either be connected to the vehicle 108 during that time step or not connected to the vehicle 108 during that time step. This can be represented as a selection decision of 0 or 1 for each edge server at each time step, where a selection decision of 0 indicates that the edge server is not connected to the vehicle 108 during the time step and a selection decision of 1 indicates that the edge server is connected to the vehicle 108 during the time step.

Figure 6:
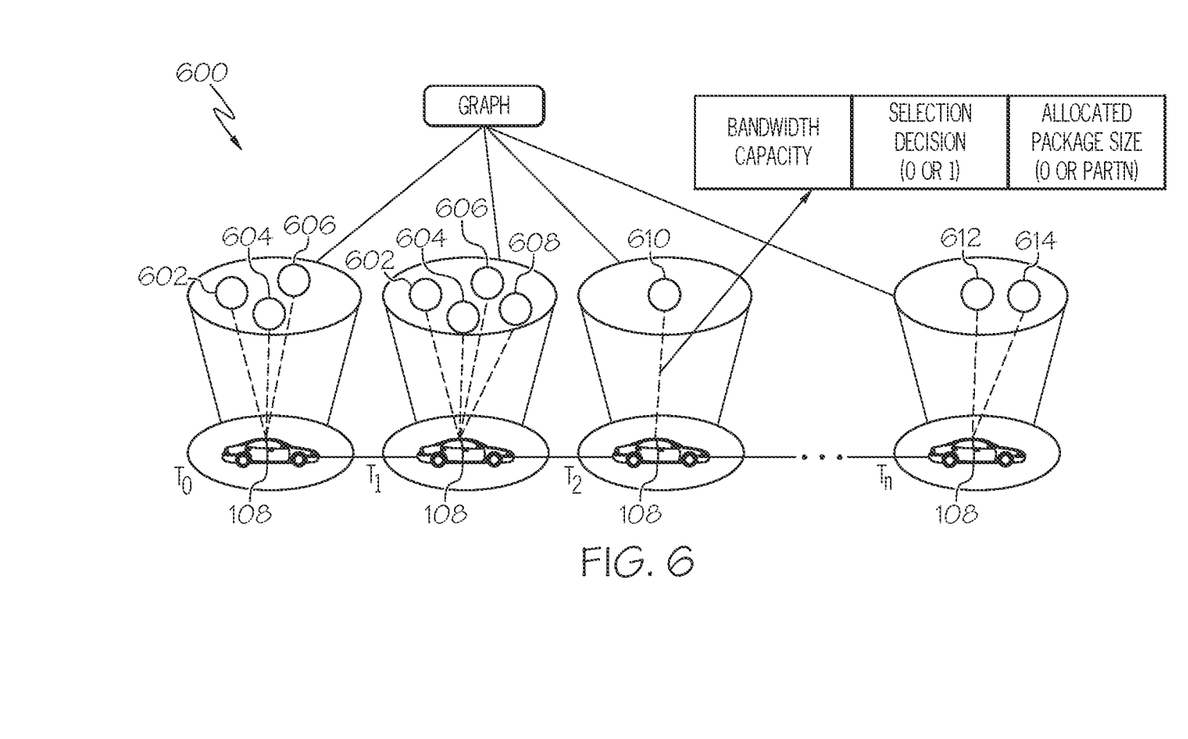
FIG. 6 depicts another example illustration of a state, according to one or more embodiments shown and described herein.

For example, FIG. 6 illustrates a state 600 for time steps T0, T1, T2, and Tn. At time step T0, the vehicle 108 is able to connect to edge servers 602, 604, and 606, at time step T1, the vehicle 108 is able to connect to edge servers 602, 604, 606, and 608, at time step T2, the vehicle 108 is able to connect to edge server 610, and at time Tn, the vehicle 108 is able to connect to edge servers 612 and 614. Thus, at each time step, each edge server within range of the vehicle 108 can have a selection decision of 1 if the edge server is connected to the vehicle 108, and can have a selection decision of 0 if the edge server is not connected to the vehicle 108.

Figure 7:
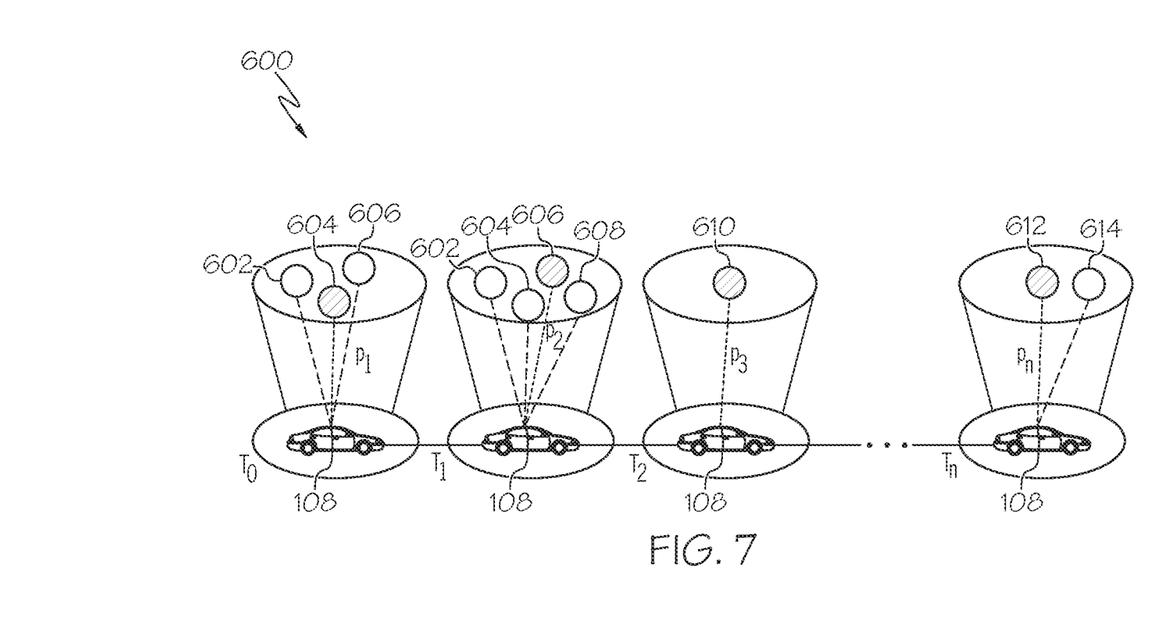
FIG. 7 depicts example illustration of an action, according to one or more embodiments shown and described herein.

FIG. 7 shows an example illustration of the state 600 of FIG. 6, in which the vehicle 108 is connected to one of the edge servers within range at each time step. In particular, in the example of FIG. 7, the media content requested by the vehicle 108 is partitioned by the cloud server 102 into packages p1, p2, p3 and pn. The vehicle 108 is connected to edge server 604 at time step T0 and downloads package p1, connected to edge server 606 at time step T1 and downloads package p2, connected to edge server 610 at time step T2 and downloads package p3, and connected to edge server 612 at time step Tn and downloads package pn. Thus, at time step T0, edge servers 602 and 606 have a selection decision of 0 and edge server 604 has a selection decision of 1; at time step T1, edge servers 602, 604, and 608 have a selection decision of 0 and edge server 606 has a selection decision of 1, at time step T2, edge server 610 has a selection decision of 1, and a time step Tn, edge server 614 has a selection decision of 0 and edge server 612 has a selection decision of 1. Each of these selection decisions is included in an action that may be determined by the action determination module 318.

In addition to a selection decision for each server at each time step, an action may also include a package size for each edge server having a selection decision of 1. The package size may indicate a data size of a package allocated by the cloud server 102 to be transmitted by the edge server to the vehicle 108 while the vehicle 108 is connected to the edge server. That is, the package size may indicate a portion of the media content requested by the vehicle 108 to be transmitted to the vehicle 108 via a particular edge server. As discussed above, the database 312 may store information about edge servers including their bandwidth capacity. Thus, the package size for an edge server should not exceed the bandwidth capacity of the edge server. That is, the amount of data to be transmitted to the vehicle 108 by a particular edge server should not exceed the amount of data that the edge server is able to transmit to the vehicle 108 during the time the edge server is connected to the vehicle 108, based on the edge server's bandwidth capacity. In some examples, the cloud server 102 may predict the bandwidth capacity of each edge server at each of the plurality of time steps of the planned driving trip based on historical data comprising past bandwidth capacities of the edge servers.

As discussed above, an action for a particular state may include a selection decision for each edge server within range of the vehicle 108 at each time step, and a package size for each edge server. Thus, an action may indicate which edge server the vehicle 108 should connect to during each time step of a driving trip, and how the media content requested by the vehicle 108 should be partitioned across the various edge servers.

Figure 8:
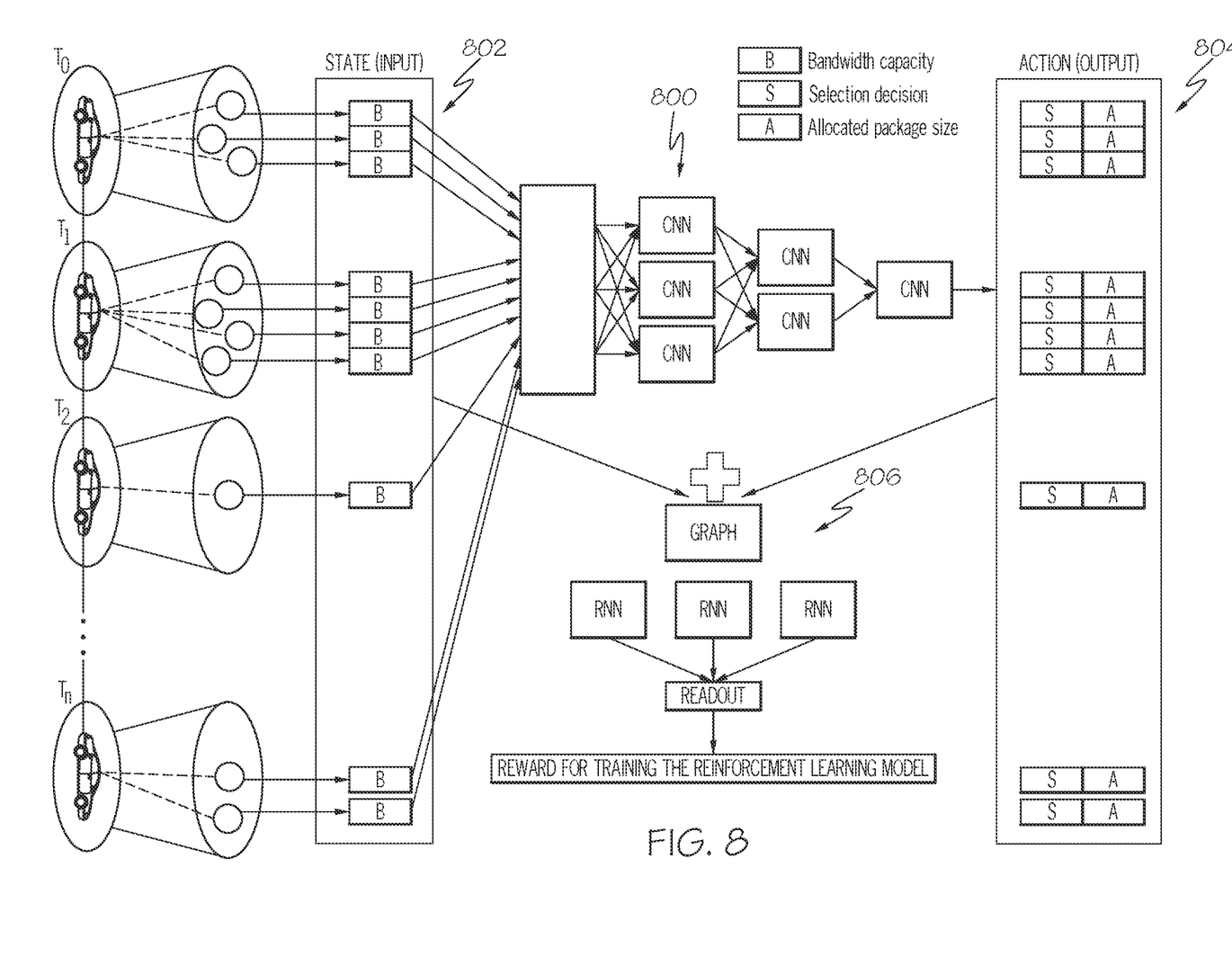
FIG. 8 depicts an example illustration of a model, according to one or more embodiments shown and described herein.

Referring back to FIG. 3, the action determination module 318 may determine an action for a state output by the state determination module 316. In embodiments, the action determination module 318 may determine the action by inputting the state output by the state determination module 316 into a model, which outputs an action based on a state. FIG. 8 shows an example illustrates of a model 800 that receives an input state 802 and outputs an action 804. As discussed above, the state 802 may comprise a graph indicating all possible connections between the vehicle 108 and one or more edge servers at each of a plurality of time steps during a driving trip. The state may also include a bandwidth capacity of each edge server. The action may include a selection decision for each edge server at each time step as well as an allocated package size for each edge server. In the example of FIG. 8, the model 800 comprises a plurality of convolutional neural networks (CNN). However, in other examples, the model 800 may comprise other architectures to receive an input state and output an action.

As discussed above, the goal of the cloud server 102 is to partition the media content requested by the vehicle 108 across a plurality of edge servers so as to minimize the latency in delivering the media content to the vehicle 108. In particular, the goal of the cloud server 102 is to minimize end-to-end latency, comprising a total amount of time required to transmit the media content from the cloud server 102 to the vehicle 108 via the plurality of edge servers. Accordingly, the model 800 of FIG. 8 may be trained to minimize end-to-end latency, as discussed in further detail below.

Referring back to FIG. 3, the model training module 320 may train the model to determine an action that minimizes latency given an input state determined by the state determination module 316. Because the potential actions for any input state are infinite space, it is not possible to consider every possible action for a given state. As such, the model may be trained to learn features of an input state and output an action. Because the input state may be represented as a graph, as discussed above, the model training module 320 may utilize a graph neural network to train the model. In the example of FIG. 8, a graph neural network 806 comprising a plurality of recurrent neural networks (RNN) is used to train the model 800. However, in other examples, the model training module 320 may utilize a graph neural network having other architectures.

In the example of FIG. 8, the model training module 320 causes the graph neural network to train the model using reinforcement learning. As shown in the example of FIG. 8, the graph neural network 806 may receive the state determined by the state determination module 316 and the action determined by the action determination module 318. The model training module 320 may then determine the end-to-end latency expected for the transmission of the requested media content from the cloud server 102 to the vehicle 108 given the action. In particular, the model training module 320 may determine a total amount of time expected for each partition of the media content to be transmitted from the respective edge servers selected according to the action to the vehicle 108. The determined end-to-end latency may be a reward utilized by the graph neural network to train the model using reinforcement learning.

In operation, the model training module 320 may utilize a large number of graphs representing different vehicle trajectories as training data. For each training data graph, the model training module 320 may input the graph to the model, which outputs an action, and the model training module 320 may determine an end-to-end latency for the action. The model training module 320 may then utilize the graph neural network to train the model using reinforcement learning based on the training data, wherein the determined end-to-end latency comprises the reward used for reinforcement learning. After the model is trained, the action determination module 318 may utilize the trained model to output an action that minimizes expected latency for a given input state. That is, the action determination module 318 may determine how the requested media content should be partitioned across the edge servers identified by the input state, and which edge servers the vehicle 108 should connect to at each time step during the driving trip.

Referring back to FIG. 3, the data distribution module 322 may partition the requested media content as indicated by the action output by the action determination module 318. The data distribution module 322 may then cause the network interface hardware 306 to transmit each partition to the appropriate edge server. As such, as the vehicle 108 drives along the specified trajectory, the vehicle 108 may connect to the edge servers at the time steps specified by the action and download the appropriate partitions of the requested media content. Thus, the vehicle 108 may download the entire media content in a manner that reduces end-to-end latency.

Figure 9:
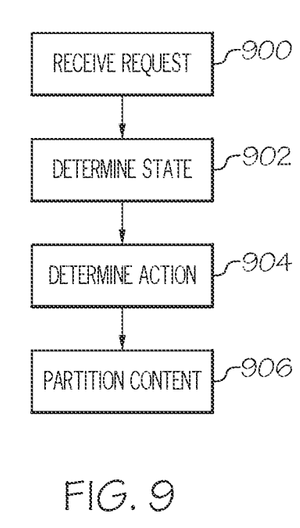
FIG. 9 shows a flowchart of a method of operating the cloud server of FIGS. 1 and 3, according to one or more embodiments shown and described herein.

FIG. 9 depicts a flowchart of an example method for operating the cloud server 102. At step 900, the vehicle request reception module 314 receives a request, from the vehicle 108, to download media content from the cloud server 102. The request may include a vehicle trajectory or planned route of the vehicle 108. The planned route may travel through an area covered by a plurality of edge servers.

At step 902, the state determination module 316 determines a state comprising possible connections between the vehicle 108 and each of the edge servers at a plurality of time steps during the planned route. In particular, the state determination module 316 may predict a location of the vehicle 108 at each time step during the planned route based on the received trajectory, and a map indicating a location of each of the edge servers and a transmission range of each of the edge servers.

At step 904, the action determination module 318 determines an action by inputting the state determined by the state determination module 316 into a trained model, maintained by the cloud server 102. As discussed above, the model is trained to output an action comprising a partition of the media content requested by the vehicle 108 across the plurality of edge servers that minimizes latency of transmission of the content from the cloud server 102 to the vehicle 108 via the plurality of edge servers.

At step 906, the data distribution module 322 partitions the requested media content according to the action output by the action determination module 318. In particular, the data distribution module 322 may transmit each portion of the requested media content to respective edge servers, according to the determined action. As such, when the vehicle 108 is within range of each edge server, the vehicle 108 may download the portion of the content stored by the respective edge server.

The action determined by the action determination module 318 may comprise a selection decision and an allocated package size for each edge server at each time step during the planned route of the vehicle 108. The selection decision for an edge server and a time step may indicate whether the vehicle 108 connects to the particular edge server during the particular time step. The allocated package size for an edge server may indicate a size of a partition of the content to be transmitted from the edge server to the vehicle 108 while the vehicle 108 is connected to the edge server.

Figure 10:
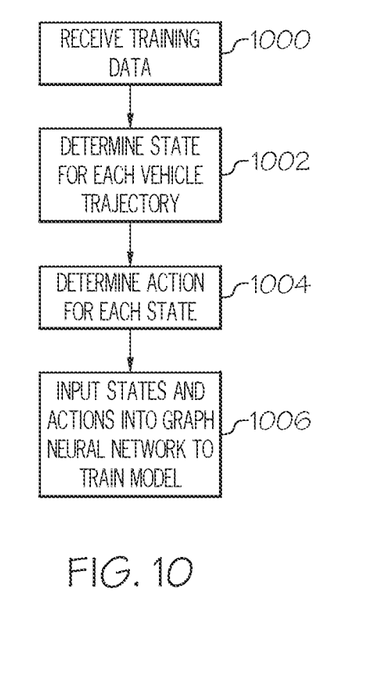
FIG. 10 depicts a flowchart of a method of training the model maintained by the cloud server of FIGS. 1 and 3, according to one or more embodiments shown and described herein.

FIG. 10 depicts a flowchart of an example method for training the model maintained by the cloud server 102. At step 1000, the cloud server 102 receives training data. The training data may comprise a plurality of vehicle trajectories and a request to download media content from the cloud server 102 associated with each vehicle trajectory. Each vehicle trajectory may travel through an area covered by a plurality of edge servers. The training data may be stored in the database 312.

At step 1002, the state determination module 316 determines a state for each vehicle trajectory included in the training data. At step 1004, the action determination module 318 determines an action based on each state determined by the state determination module 316 by inputting each state into the model maintained by the cloud server 102.

At step 1006, the model training module 320 inputs each state determined by the state determination module 316 and each associated action determined by the action determination module 318 into a graph neural network. The graph neural network may determine an end-to-end latency of transmission for each state/action pair, which may be used as a reward to train the model to minimize the end-to-end latency using reinforcement learning. After the model is trained, the parameters of the trained model may be stored in the database 312.

It should now be understood that embodiments described herein are directed to a method and system for edge server selection for in-vehicle media content distribution with deep reinforcement learning. A cloud server may receive training data comprising a plurality of trajectories for a vehicle. The cloud server may determine a state associated with each vehicle trajectory comprising possible connections between the vehicle and a plurality of edge servers. Each state may be input into a model, which outputs an action comprising specific connections between the vehicle and edge servers at a plurality of time steps during the vehicle trajectory. Each state/action pair may be input into a graph neural network, which determines an end-to-end latency of transmission of media content based on the state/action pair. The graph neural network may then use the determined end-to-end latency as a reward to train the model to minimize the end-to-end latency using reinforcement learning.

After the model is trained, a vehicle may transmit a request for media content to the cloud server along with a planned vehicle trajectory. The cloud server may determine a state based on the request and the vehicle trajectory and input the state into the trained model. The model may output an action indicating how the media content should be partitioned across a plurality of edge servers to minimize latency of transmission of the media content to the vehicle. The cloud server may then partition the content across the edge servers as specified by the action. Thus, as the vehicle drives along the planned trajectory, it may connect to different edge servers at different times as the vehicle comes within range of the edge servers, and download the partitioned content from each edge server. Thus, over the course of the driving trip, the vehicle may efficiently download the entirety of the requested media content.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving training data comprising a plurality of vehicle trajectories and a request to download content from a cloud server associated with each vehicle trajectory, each vehicle trajectory traveling through an area covered by a plurality of edge servers;
   determining a location, a transmission range, and a bandwidth capacity of each of the plurality of edge servers based on a map associated with the plurality of edge servers;
   for each vehicle trajectory, determining which of the plurality of edge servers will be within range of the vehicle at a plurality of time steps during the vehicle trajectory based on speed limits at different points along the vehicle trajectory and the transmission range of each of the plurality of edge servers;
   for each vehicle trajectory, determining a graph associated with the vehicle trajectory, the graph indicating a state comprising possible connections between a vehicle and the plurality of edge servers at a plurality of time steps during the vehicle trajectory based on the determination as to which of the plurality of edge servers will be within range of the vehicle at the plurality of time steps, each edge server comprising a node of the graph, and each possible connection between the vehicle and an edge server comprising an edge of the graph;
   inputting the state associated with each vehicle trajectory into a convolutional neural network configured to output an action, the action comprising a partition of the content associated with the vehicle trajectory associated with the state across the plurality of edge servers;
   for each vehicle trajectory, determining a latency of transmission of the content from the cloud server to the vehicle based on the action determined by the convolutional neural network;
   inputting each state and each associated action determined by the convolutional neural network into a graph neural network configured to train the convolutional neural network to minimize the latency of transmission of the content from the cloud server to the vehicle via the plurality of edge servers using reinforcement learning with the determined latency used as a reward; and
   training the convolutional neural network based on an output of the graph neural network.

2. The method of claim 1, wherein the action comprises a selection decision and an allocated package size for each edge server at each time step during the vehicle trajectory;
   the selection decision for an edge server and a time step indicates whether the vehicle connects to the edge server during the time step; and
   the allocated package size for an edge server indicates a size of a partition of the content to be transmitted from the edge server to the vehicle while the vehicle is connected to the edge server.

3. The method of claim 1, further comprising determining the latency of transmission based on a bandwidth capacity of each of the edge servers.

4. The method of claim 1, wherein the graph neural network comprises a plurality of recurrent neural networks.

5. The method of claim 1, further comprising:
   receiving a planned route of a first vehicle and a request to download content from the cloud server, the planned route traveling through an area covered by the plurality of edge servers;
   determining a first state comprising possible connections between the first vehicle and each of the plurality of edge servers at a first plurality of time steps during the planned route;
   inputting the state to the trained convolutional neural network; and
   partitioning the content across the plurality of edge servers based on a first action output by the trained convolutional neural network.

6. The method of claim 5, further comprising determining the first state based on a map of the area through which the planned route travels, the map indicating a location of each of the edge servers and a transmission range of each of the edge servers.

7. The method of claim 6, further comprising:
   predicting a location of the first vehicle at each of the first plurality of time steps during the planned route based on the map;
   determining which of the edge servers are within the transmission range of the vehicle at each of the first plurality of time steps during the planned route; and
   determining the first state based on the predicting and the determining.

8. The method of claim 5, further comprising predicting the bandwidth capacity of the plurality of edge servers at each of the first plurality of time steps during the planned route based on historical data.

9. A remote computing device comprising a controller programmed to:
   receive training data comprising a plurality of vehicle trajectories and a request to download content from a cloud server associated with each vehicle trajectory, each vehicle trajectory traveling through an area covered by a plurality of edge servers;

determine a location, a transmission range, and a bandwidth capacity of each of the plurality of edge servers based on a map associated with the plurality of edge servers;

for each vehicle trajectory, determine which of the plurality of edge servers will be within range of the vehicle at a plurality of time steps during the vehicle trajectory based on speed limits at different points along the vehicle trajectory and the transmission range of each of the plurality of edge servers;

for each vehicle trajectory, determine a graph associated with the vehicle trajectory, the graph indicating a state comprising possible connections between a vehicle and the plurality of edge servers at a plurality of time steps during the vehicle trajectory based on the determination as to which of the plurality of edge servers will be within range of the vehicle at the plurality of time steps, each edge server comprising a node of the graph, and each possible connection between the vehicle and an edge server comprising an edge of the graph;

input the state associated with each vehicle trajectory into a convolutional neural network configured to output an action, the action comprising a partition of the content associated with the vehicle trajectory associated with the state across the plurality of edge servers;

for each vehicle trajectory, determine a latency of transmission of the content from the cloud server to the vehicle based on the action determined by the convolutional neural network;

input each state and each associated action determined by the convolutional neural network into a graph neural network configured to train the convolutional neural network to minimize the latency of transmission of the content from the cloud server to the vehicle via the plurality of edge servers using reinforcement learning with the determined latency used as a reward; and train the convolutional neural network based on an output of the graph neural network.

10. The remote computing device of claim 9, wherein the action comprises a selection decision and an allocated package size for each edge server at each time step during the vehicle trajectory;

the selection decision for an edge server and a time step indicates whether the vehicle connects to the edge server during the time step; and the allocated package size for an edge server indicates a size of a partition of the content to be transmitted from the edge server to the vehicle while the vehicle is connected to the edge server.

11. The remote computing device of claim 9, wherein the controller is further programmed to determine the latency of transmission based on a bandwidth capacity of each of the edge servers.

12. The remote computing device of claim 9, wherein the graph neural network comprises a plurality of recurrent neural networks.

13. The remote computing device of claim 9, wherein the controller is further programmed to:

receive a planned route of a first vehicle and a request to download content from the cloud server, the planned route traveling through an area covered by the plurality of edge servers;

determine a first state comprising possible connections between the first vehicle and each of the plurality of edge servers at a first plurality of time steps during the planned route;

input the state to the trained convolutional neural network; and partition the content across the plurality of edge servers based on a first action output by the trained convolutional neural network.

14. The remote computing device of claim 13, wherein the controller is further configured to determine the first state based on a map of the area through which the planned route travels, the map indicating a location of each of the edge servers and a transmission range of each of the edge servers.

15. The remote computing device of claim 14, herein the controller is further configured to:

predict a location of the first vehicle at each of the first plurality of time steps during the planned route based on the map;

determine which of the edge servers are within the transmission range of the vehicle at each of the first plurality of time steps during the planned route; and determine the first state based on the predicted locations and the determined edge servers.

16. The remote computing device of claim 13, wherein the controller is further configured to predict the bandwidth capacity of the plurality of edge servers at each of the first plurality of time steps during the planned route based on historical data.

* * * * *